Figure 1:
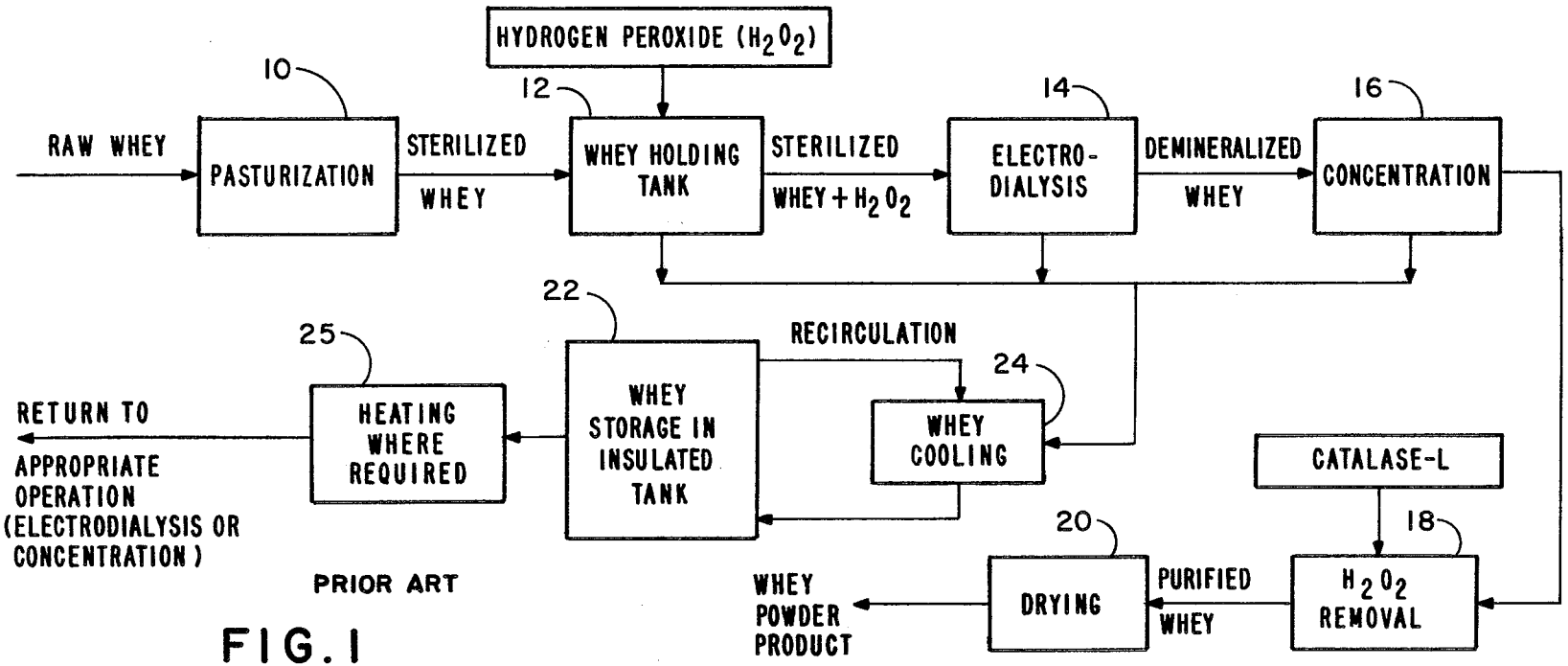
PRIOR ART FIG. 1
Figure 2:
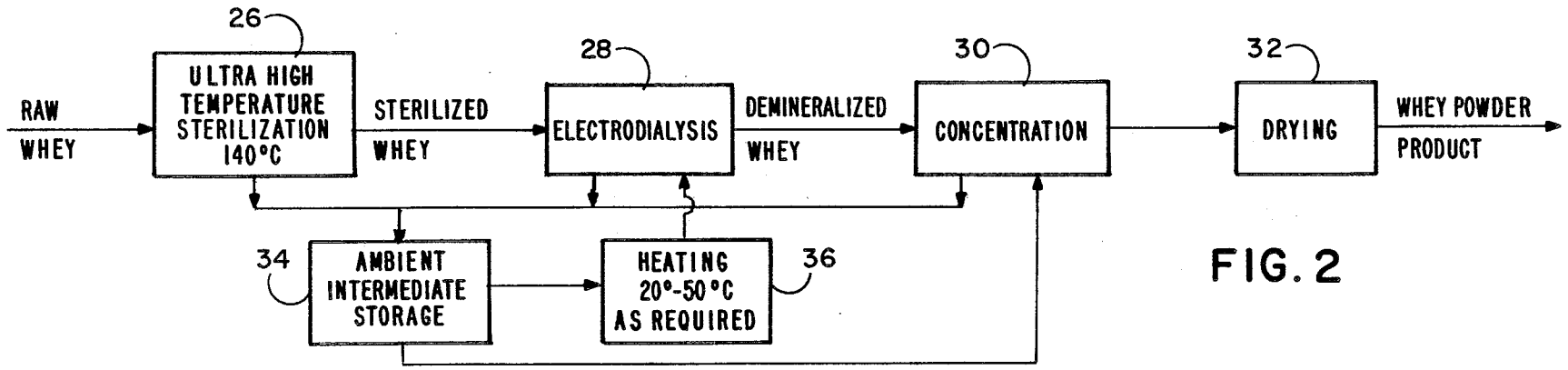

United States Defensive Publication [19] (H) [11] T990,005

Iaconelli [43] Jan. 1, 1980

[54] PROCESS FOR THE ELECTRODIALYSIS TREATMENT OF WHEY

[76] Inventor: William B. Iaconelli, 32 10th Ave., Scituate, Mass. 02066

[21] Appl. No.: 963,079

[22] Filed: Nov. 22, 1978

[51] Int. Cl.[2] ..... A21D 6/00

[52] U.S. Cl. ..... 426/239; 210/22 R; 426/491; 426/522; 426/583

[57] ABSTRACT

An improved process for the electrodialysis treatment of liquid whey is disclosed in which the raw whey is first subjected to an ultra high temperature environment of about between 130° C. to 150° C. for a period of approximately two seconds to sterilize the whey. The sterilized whey is then subjected to cooling and then to electrodialysis to effect a substantial reduction in ash content.

1 Claim, 1 Sheet Drawing,

8 Pages Specification

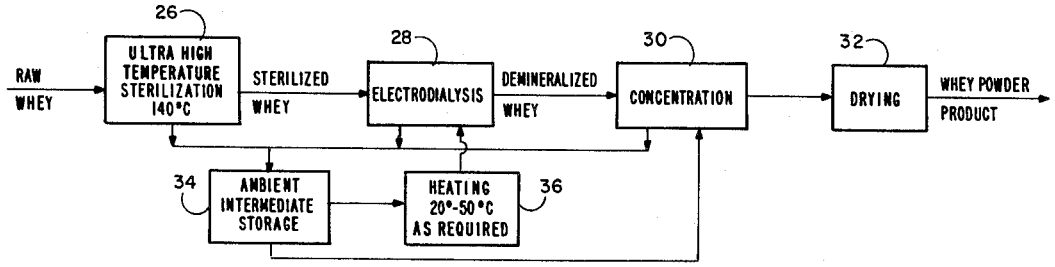

The file of this unexamined application may be inspected and copies thereof may be purchased (849 O.G. 1221, Apr. 9, 1968).